United States Patent [19]

Edixhoven

[11] 4,188,693

[45] Feb. 19, 1980

[54] METHOD AND APPARATUS FOR ASSEMBLING SLATTED BLINDS

[75] Inventor: G. H. Edixhoven, Voorschoten, Netherlands

[73] Assignee: Hunter Douglas International N.V., Curacao, Netherlands Antilles

[21] Appl. No.: 815,317

[22] Filed: Jul. 13, 1977

[30] Foreign Application Priority Data

Sep. 30, 1976 [DE] Fed. Rep. of Germany ....... 2644276

[51] Int. Cl.$^2$ ............................................. B23P 19/04

[52] U.S. Cl. ....................................... 29/24.5; 29/429; 160/236; 160/172; 29/771

[58] Field of Search ......... 29/450, 24.5, 428, 400 RL, 29/791, 771, 779, 789, 797, 819, 429; 160/236, 172

[56] References Cited

U.S. PATENT DOCUMENTS

| | | | |
|---|---|---|---|
| 2,827,686 | 3/1958 | Adelman | 29/24.5 |
| 3,015,156 | 1/1962 | Ewing | 29/429 |
| 3,292,232 | 12/1966 | Nilsson | 29/24.5 |

FOREIGN PATENT DOCUMENTS

| | | | |
|---|---|---|---|
| 2317355 | 12/1974 | Fed. Rep. of Germany | 29/428 |

*Primary Examiner*—Daniel C. Crane
*Attorney, Agent, or Firm*—Pennie & Edmonds

[57] ABSTRACT

A method and apparatus are disclosed for assembling the slats of a blind to the supporting ladders which ladders have pairs of closely spaced cross bars or rung pairs between which pairs of rungs slats are to be inserted. The assembly is accomplished by inserting only a portion of the end of the slat first whereby that portion serves to guide the smooth insertion of the remainder of the width of the end of the slat.

21 Claims, 6 Drawing Figures

METHOD AND APPARATUS FOR ASSEMBLING SLATTED BLINDS

PRIOR ART

Hitherto the mechanical insertion of the slats between two closely adjacent rungs has been possible only in the case of a slat of relatively great width (for example 50 mm) and at a relatively slow speed, since the flexible material of the ladder and the small space between the two rungs causes difficulties which increase as slat width decreases.

It is known for example in German Pat. No. 2,317,355 that before the insertion of a slat between the two rungs a wedge-shaped spreading element may be inserted, while at the same time two spreading members acting on the uprights of the ladder produce stretching of the rungs. Two spreading elements are required, which are positioned adjacent to the lateral uprights to spread the uprights in a timed repetitive sequence which in addition to the need for accuracy of the operation, requires a rather large engineering expense. However, this mode of procedure is not satisfactory in either reliability or speed of assembly, and is particularly not suitable for the manufacture of blinds having a short slat width, for example on the order of magnitude of 25–35 mm, such being impossible.

SUMMARY OF THE INVENTION

Starting from this, the object of the invention is to make it possible to obtain a rapid and reliable assembly of the slats between the rung pairs by mechanical means, and in particular to insert mechanically between the rung pairs rather narrow slats, having a width for example of 25–35 mm, and further, to accomplish the same with ladders of comparatively thin cord or the like.

The invention accomplishes this object by inserting only a portion of the width of the end of the slat between the rung pairs and only thereafter inserting the remaining width. By the process of this invention wherein only a portion of the width of the slat is initially inserted into the narrow slot between rung pairs, the remaining front edge of the end of the slat serves as a guide so that the end of the slat is gradually able to pass through up to its full width between the rung pair with no danger of becoming caught.

One manner of accomplishing the objective is to suitably shape the front edge of the leading end of the slat. For example, the front edge may be rounded off, whereby the foremost portion of the end of the slat then extends across only a small portion of the total width and may be inserted first. Alternatively, the front edge of the end of the slat may be cut straight across but not precisely at right angles to the direction of feed or the longitudinal axis of the slat. In this way, one corner of the leading end of the slat is slightly ahead of the other and may be inserted first. The angle of the front edge with respect to the longitudinal edges of the slat may be very slightly different from the usual 90°, for example, only a few degrees such as, say, about 5°. That is, one side would be, say 85° with respect to the leading edge and the other side 105° with respect thereto.

In the preferred embodiment of the invention the leading edge of the slat is cut at 90° to the longitudinal edges of the slat while the rung pairs are held at an angle to the direction of the slat feed with the plane of the slat extending between the closely spaced rung pairs. In this way one corner of the leading edge of the slat reaches the ladder first and is inserted first followed by the remaining width of the slat.

How great the divergence with respect to 90° must be in a particular case depends, among other things, upon the material and upon the sizing of the ladder, as well as upon the width of the slat and the speed of feed. A divergence of a few degrees, for example 5° from a true 90°, is generally adequate.

The invention further contemplates an apparatus by the use of which a slat or a strip of slats may be assembled between the rung pairs quickly and reliably by mechanical means. Such mechanical means includes a spreading assembly having two spreading members and a feed and guide assembly. The feed and guide assembly and the spreading assembly are arranged in relation to each other such that the longitudinal central axis of the slat or slat strip being fed by the feed and guide assembly and the longitudinal axis of rung pairs sequentially positioned to recive the slat form an angle diverging slightly from 90°. Such angular arrangement permits initial insertion of only one corner of the slat leading edge between the rung pair followed by insertion of the remaining width. The front edge of the slat to be inserted may thus be cut at right angles to the longitudinal edges of the slat without any particular unique shaping of the leading edge being necessary.

With reference to the extent of the divergence from 90°, the same as previously stated above in connection with the process applies.

According to another feature of the invention, the device may be designed such that the spreading members are arranged to be movable apart, preferable swingable on pivots. The axes of the pivots are generally parallel to the direction of feed of the slat. The axes of rotation of the two spreading members also may be advantageously structurally combined. Each spreading member has a guide slot through which the rung pairs pass and in which they are guided, with the guide slots of the two spreading members facing each other.

In the presently preferred embodiment the guide slots of the spreading members are arranged mutually displaced along the direction of feed. This makes it possible in particularly simple fashion to obtain the aforementioned angle diverging slightly from 90° between the longitudinal central axis of the slats and the longidutinal axis (i.e., transverse to the length of the ladder) of the rung pair receiving the slat to be fed. The spreading members are, accordingly, also correspondingly displaced.

It is another feature of the invention, that the spreading members are biased apart by a spreading force, preferably a resilient force, acting resiliently and urging them apart in the direction of spread. By this means good stretching of the rung pairs is achieved, while the spreading members at the same time are yieldingly resilient thus achieving additional advantages. First of all, this resilient arrangement permits the stepwise raising of the ladder after the insertion of each slat. A further advantage is also achieved in that each spreading member has a guide element forming the guide slot which guide elements are formed such that the guide slots at the plane of slat feed each have an inward bulge whereby they are a shorter distance apart at this point than in the adjoining regions directly below or above this plane. This design makes it possible specifically to obtain, in relation to the plane of insertion or feed, an automatic adjustment into the proper plane of the successive rung pairs into which the end of a slat is to be inserted. The spreading force and the resiliency of the spreading members cause the successive rung pairs always to slip into the part of the guide slots in which the distance between the guide slots is the shortest (i.e., into the plane of insertion). Even if, therefore, in the stepwise raising of the ladder the particular rung pair has not yet quite reached the plane of insertion or alternatively has gone somewhat beyond it, the rung pair will automatically slip into proper position thus adjusting itself precisely to the level of the plane of insertion. In addition to this very substantial advantage, there is the simultaneously advantage that no further measures for the attainment of any additional precision in raising of the ladder need be taken.

There is also provided directly ahead of the region of insertion, a guide rail extending across the width of the plane of feed. The upper surface of this guide rail serves as a sliding and guiding surface for the slat or slat strip. By this means the accuracy with which the end of the slat may be inserted between the rung pairs and the reliability of this insertion is still further improved.

Either slats provided with the necessary openings and in each instance cut to final length or, alternatively, a strip of slats, not yet correspondingly finished, may be inserted between the rung pairs and, depending upon the particular width of the blind, this insertion may take place successively in a plurality of spaced ladders. For this purpose an insertion station is provided for each ladder with each station being suitably spaced from the next. When each successive slat has assumed its final position in the rung pairs, situated at about the same level, of all the ladders, the slat will be raised far enough for insertion of the next successive slat into the next lower set of rung pairs of the ladders. The already inserted slat is also raised up to the overlying stack of slats previously assembled. Stepwise raising of the ladders always takes place with raising of a slat.

The ladders may be of strip materials or alternatively of cords, chains or the like.

BRIEF DESCRIPTION OF THE DRAWINGS

The manner of performing the process and the structure of the apparatus of this invention will be apparent to those skilled in the art from the following detailed description and the accompanying drawings in which.

DETAILED DESCRIPTION OF THE INVENTION

Figure 1:
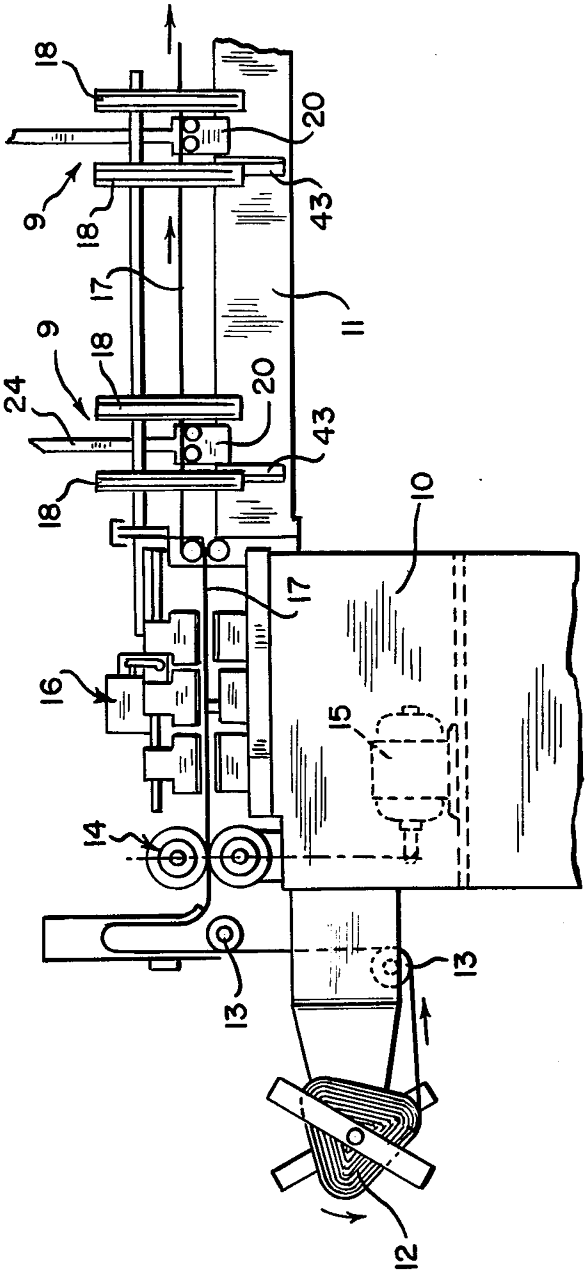
FIG. 1 shows in elevation a portion of a blind assembly machine, largely schematically, in which the present invention may be used.

The portion of a machine for the mechanical production of slatted blinds represented in FIG. 1 has a machine table 10 and an assembly stand 11. To the machine table 10 is fastened a stock drum 12 with a roll of strip material for slats. This is carried over rollers 13 to a first pair of rolls 14, which are driven by a motor 15. The strip of sheet metal forming the slat strip then runs through a device 16 where it is straightened and shaped. In addition, the apertures necessary for passage of a raising member are punched in the slat material by the device 16 and the sheet-metal strip is cut to the length desired in each instance into a slat 17.

The assembly stand 11 has a plurality of stations 9. The number of these stations 9 depends specifically upon the requirements, in particular, upon the slat length or blind width provided in each instance. At each station a plurality of slats are sequentially assembled with a ladder which serves to hold and guide the individual slats. A raising member is also assembled to the slats at each station. Assembly of the raising member is not described herein since the same is known.

Figure 2:
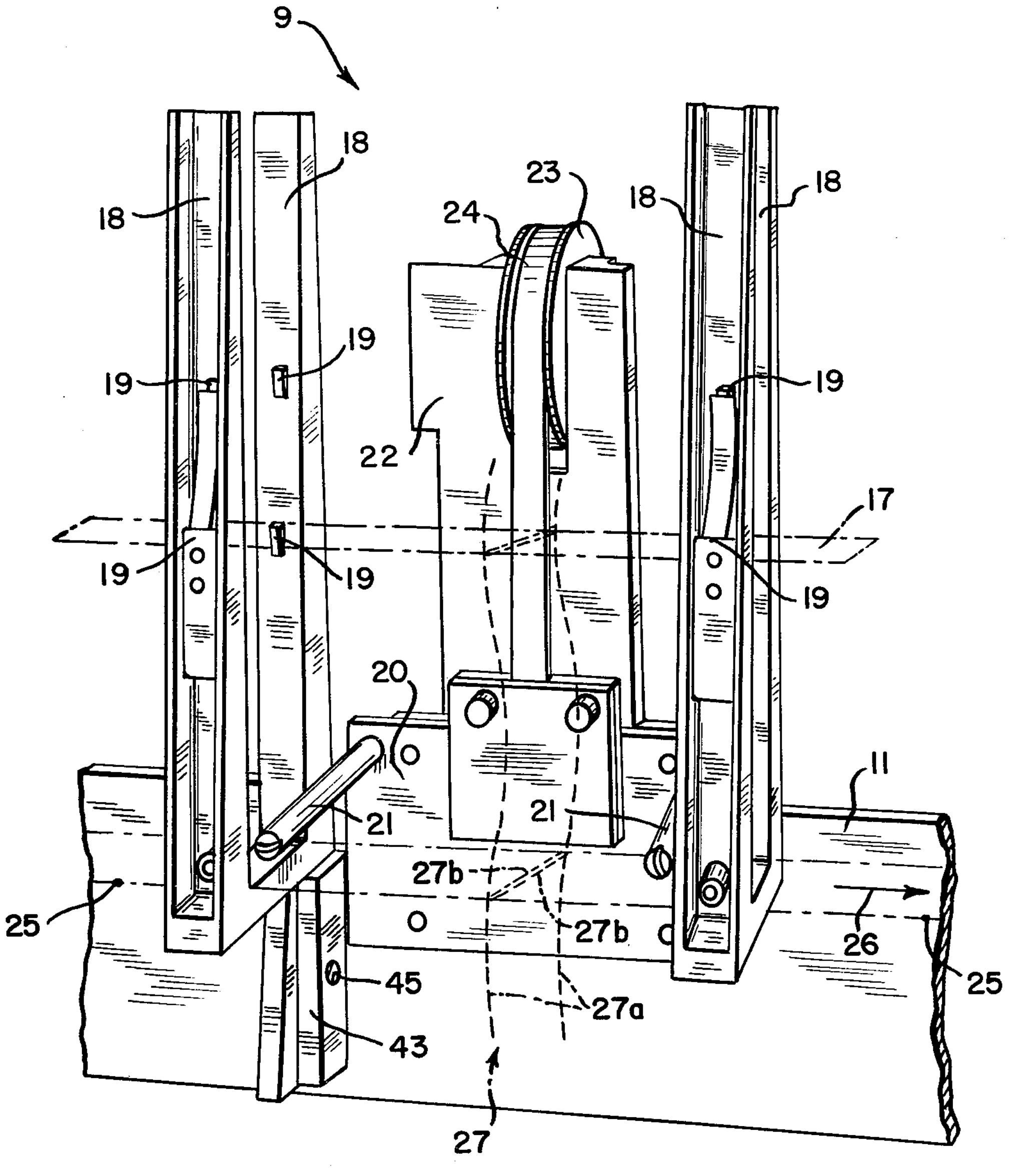
FIG. 2 shows a portion, in perspective, of one of a plurality of working stations in enlarged scale.

Each station 9 of the assembly stand 11 has two vertical U-shaped holders 18, see FIG. 2. The clear width of each holder 18 is somewhat greater than the width of a slat 17. At the inner side of the holders 18 are situated resilient stops 19 facing each other in pairs, which on raising of a slat 17 are pressed upward and outward against the action of the resilient force to allow passage of a slat 17. After the passage of a slat 17 the stops 19 again move toward each other, so that the slat 17 may rest on the total of four stops 19 (two pairs) of the two holders 18. In the present case such stops 19 are provided at vertically spaced levels on the holders 18 as shown.

Two pins 21 fastened to a plate 20 serve for transport of the individual slats 17 upward in vertical direction. The plate 20 is mounted for vertical movement on a support 22 in a manner here not described in greater detail. The upper end of support 22 has a roller 23 journaled therin. Over this is carried a belt 24, which is taut and fixed to the plate 20, so that the plate 20 and with it the pins 21 may be raised or lowered in vertical direction by a drive (not shown) acting through belt 24.

The slat strip from which the slats 17 are cut to size is conveyed in a plane of feed 25 represented in FIG. 2 by a broken line. The direction of feed is indicated by the arrow 26 and corresponds with the direction of the longitudinal axis of the slat. In FIG. 2 portions of the device of the invention are removed in order to better show the design of a station. It may be seen, however, that the slats 17 are being assembled in a ladder 27 having two lateral uprights 27*a* and rung pairs 27*b* connecting the same. The lateral uprights 27*a* comprise a cord, the diameter of which is greater than the diameter of the cords forming the rung pairs 27*b*.

Figure 3:
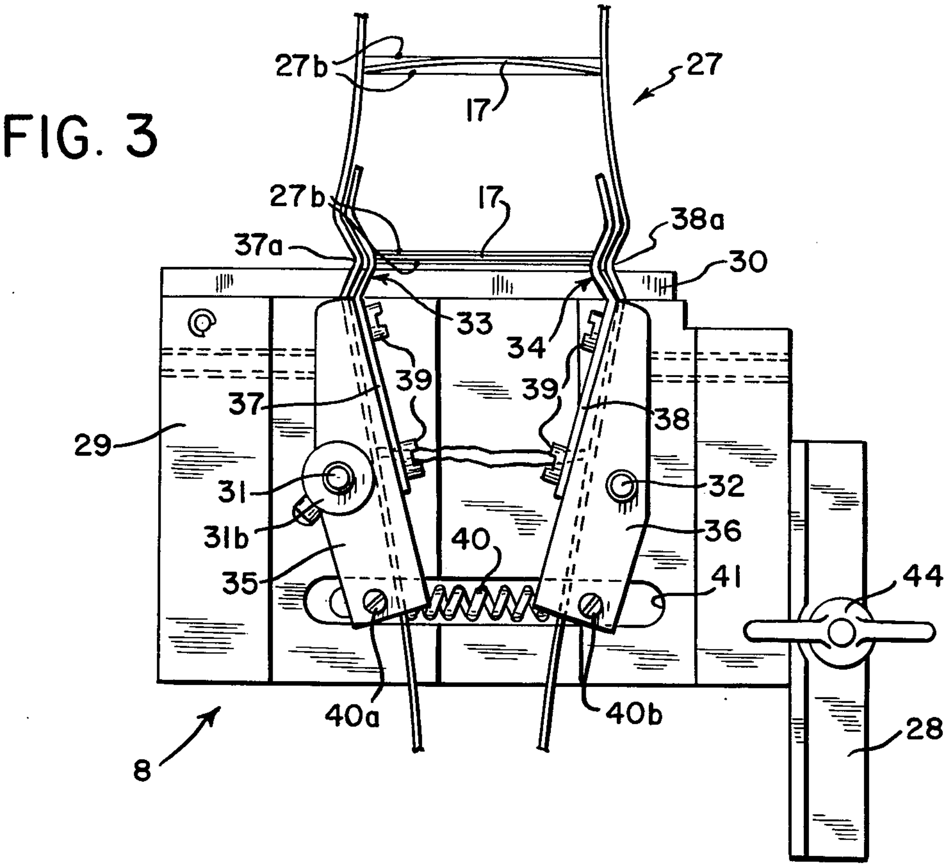
FIG. 3 shows, in schematic representation, a view of the device of the invention viewed in the direction of feed.
Figure 4:
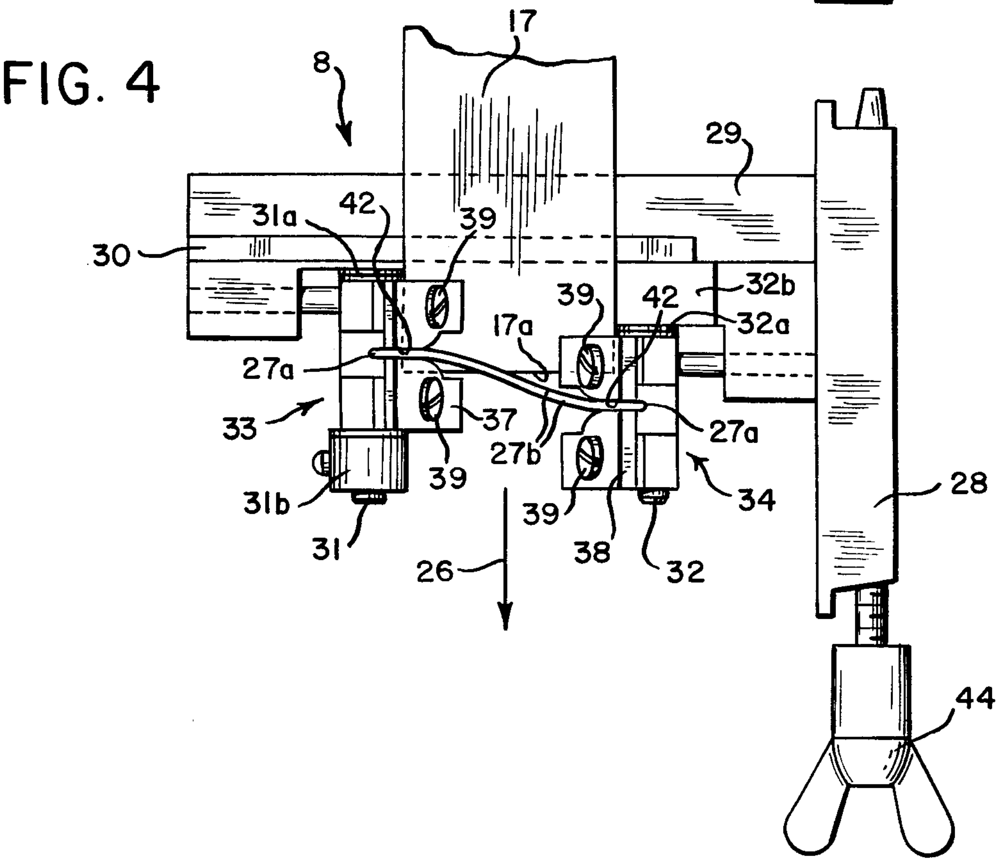
FIG. 4 shows a top plan view of the device of FIG. 3.

FIGS. 3 and 4 show the ladder guide and spreader means 8 which serves for insertion of the slats 17 between a rung pair 27*b* of ladder 27, which guide and spreader means 8 is fastened in suitable fashion to the assembly stand 11 in the region of the ladder 27. This fastening may be effected by means of a holding plate 28, on which the device is held adjustable in both the lateral and vertical direction. Transverse to the holding plate 28 there extends a supporting plate 29, on the upper side of which is provided a guide rail 30. On two shafts 31 and 32 parallel to the direction of feed as shown by arrow 26 are arranged pivotally two spreading members 33 and 34, respectively. Each spreading member 33 and 34 is formed by a two-armed lever 35 and 36, respectively, and a guide plate 37 and 38, respectively, each of which is fastened by screws 39 to its respective lever 35 and 36. The lower ends of the levers 35 and 36 are connected together by a tension spring 40, which is positioned inside a recess 41 running transverse to the direction of feed and generally parallel to the plane of feed 25. The ends of spring 40 are connected to screws 40*a* and 40*b* on the lower end of levers 35 and 36, respectively. By this arrangement essentially uniform loading of the spreading members 33 and 34 with the resilient force and an approximately even swing is obtained. While, as shown, there is a separate pivot 31 and 32 for the levers 35 and 36 respectively, it will be understood by those skilled in the art that by suitably shaping the levers 35 and 36 to overlap they may both be supported from a single pivot shaft.

Each guide plate 37 and 38 has a guide slot 42 extending vertically. The width of slots 42 adjacent the top is smaller than the diameter of the lateral uprights 27*a* of the ladder 27, but slots 42 are wide enough for the rung pairs 27*b* to be smoothly slidingly guided in it since rung pairs 27*b* are of smaller diameter than uprights 27*a* as above mentioned.

At the level of the plane of feed 25 each of the guide plates 37 and 38 has a bulge 37*a* and 38*a*, respectively extending inward, so that at this level the unobstructed distance between the guide plates 37 and 38 is smaller than in the regions just above and just below. As a result, if a rung pair 27*b*, (upon raising an inserted slat 17 and thus the ladder 27) comes to rest slightly below or above the plane 25 then it will automatically slip up or down respectively into proper position in the bulges 37*a* and 37*b*.

As may be seen from FIG. 4, the spreading member 33 with the guide plate 37 and the spreading member 34 with the guide plate 38, are slightly mutually displaced along the direction of feed so that the two guide slots 42 are also mutually displaced with respect to each other. This displacement is due to the mounting arrangement for the spreaders 33 and 34 and in particular to the mounting of the levers 35 and 36. As viewed in FIGS. 3 and 4 the left hand lever 33, mounted on the screw-like shaft 31 has a washer-like bearing member 31*a* adjacent the face of the supporting plate 29 which permits pivotal movement of the lever 35 without undue friction occurring between it and the face of the supporting plate 29. On its opposite end the screw 31 carries a spacer element 31*b*. The screw 32 has a comparable spacer element 32*b*; however, this spacer element 32*b* is adjacent the supporting plate 29 and the washer-like bearing element 32*a* bears against this spacer element 32*b* to prevent undue friction between the lever 36 and the face of the spacer element 32*b*. This arrangement provides the mutually displaced arrangement of the slots 42 with respect to the direction of feed as above mentioned. As described below the arrangement of these spacer elements 31*b* and 32*b* may be altered when using slats 17 having differently shaped leading edges.

By this means a guideway is obtained for the ladder 27 such that the rung pairs 27*b* of the ladder 27, when located at the level of the plane of feed 25, are at an angle to the longitudinal central axis of a slat 17 which angle slightly diverges from 90°. Therefore a slat 17, the front edge of which is straight and runs perpendicular to the longitudinal edges of the slat, initially always enters to the extent of only a portion of its width between the two members of a rung pair 27*b*. This point of entry, as viewed in FIG. 4, is the left corner of the leading edge 17*a*. This corner enters adjacent the left spreading member 33 as viewed in FIG. 4.

By means of the holding plate 28 and a long screw 44 the device represented in FIGS. 3 and 4 is fastened to a holding member 43 visible in FIG. 2, the screw 44 being screwed into the screw hole 45. The spreading members 33 and 34 are then situated approximately in the center of the station in the region of the ladder 27 indicated only by broken lines in FIG. 2.

OPERATION

Before the feed of a slat 17 the spreading members 33 and 34, which together with the other elements held on the supporting plate 29 form the spreading assembly, stretch a rung pair 27*b* in such fashion that the space between them is free for insertion of the slat 17. Due to the resiliency produced by the tension spring 40 and to the shaping of the guide plates 37 and 38, the ladder 27 will automatically so adjust itself in its elevation that the slot existing between a rung pair 27*b* lies at the level of the plane of feed 25. This applies in like manner for all stations 9 of the assembly stand 11.

If the slat feed is then turned on, the slat strip is passed through the spaces between a rung pair 27*b* of a ladder 27 successively at each station 9. The leading left (as viewed in FIGS. 3 & 4) corner of the slat enters first adjacent the left spreading member 33. The rung pair 27*b* is then guided so securely that the remaining portion of the width of the leading edge of the slat is likewise able to pass through without difficulty. The slat 17 continues to move on and at all succeeding stations 9 enters all succeeding ladders 27 in the space between a rung pair 27*b* in like manner.

The feed is then stopped and the slat 17 is cut to predetermined length (if not already so cut) and the pins 21, which hitherto have remained well below the plane of feed 25, are raised. The slat 17 is transported up to the level of the stops 19 and deposited there, while at the same time all of the ladders 27 are also raised and drawn through their respective spreading members 33 and 34. This upward movement of the ladders 27 positions a new rung pair 27*b* for each ladder at the level of the plane 25 of feed or else the rung pairs 27*b* readjusted themselves accurately and automatically in the manner described above.

MODIFICATIONS

Figure 5:
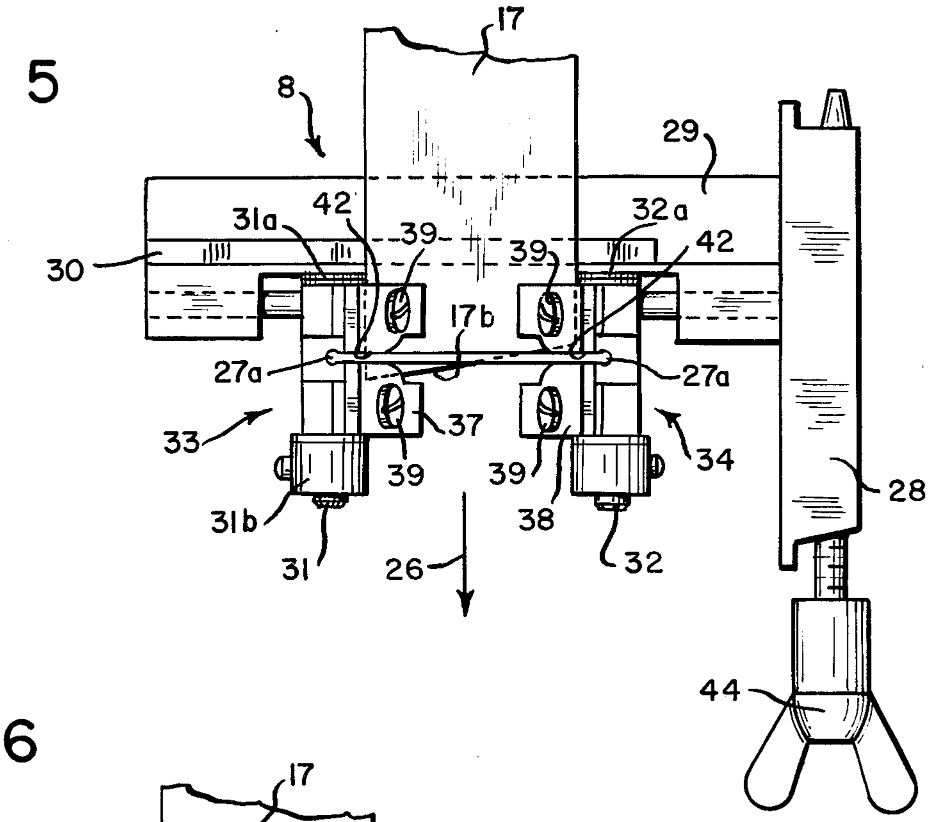
FIG. 5 shows a view like FIG. 4 of a modified form of the invention.

In FIG. 5 is shown a modification of the invention. The device shown in FIG. 5 is essentially identical to that shown in FIG. 4 excepting only that the spreading members 33 and 34 are not mutually displaced along the direction of feed. The parts are the same in the device of FIG. 5 as those in the device of FIG. 4 and carry the same reference numerals; however, the screw 32 has been removed, the spacer block 32*b* has been moved to the head end of the screw 32 and the spreader member 34 reassemled with the washer-like bearing element 32*a* against the support plate 29 in a manner comparable to that already existing with the left-hand spreader 33. As a result of this arrangement the ladder 27 and in particular the rung pairs 27*b* are no longer arranged with respect to the direction of feed at an angle slightly different from 90°. Rather, the ladder 27 and the rung pairs 27*b* now extend substantially 90° to the direction of feed. In this embodiment, however, it is still possible to insert only a portion of the width of the leading edge 17*b* of the slat 17 into the space between a rung pair 27*b*. This is possible due to the fact that the leading edge 17*b* of the slat 17 (unlike that of the leading edge 17*a* in the previous embodiment) is arranged at an angle slightly different from 90° with respect to the longitudinal edges of the slat 17. As shown this angle is exaggerated for clarity in the drawings; however, only a few degrees different from a 90° angle will suffice. For example the angle of the leading edge **17*b* may be approximately 5° divergent from a 90° angle. As shown in FIG. 5 the angle included between the leading edge 17*b* and the left-hand longitudinal edge of the slat 17 is less than 90° while the included angle between the leading edge 17*b* and the opposite longitudinal edge of the slat 17 is greater than 90°. As mentioned above, this difference may be on the order of about 5° different from 90°. As shown in FIG. 5 the left-hand corner of the leading edge 17*b* enters the space between a rung pair 27*b* first and the rest of the width of the leading edge follows. It will be appreciated that the edge 17*b* could be cut in the opposite direction so that the right-hand corner (as viewed in FIG. 5**) of the leading edge entered the ladder first.

Figure 6:
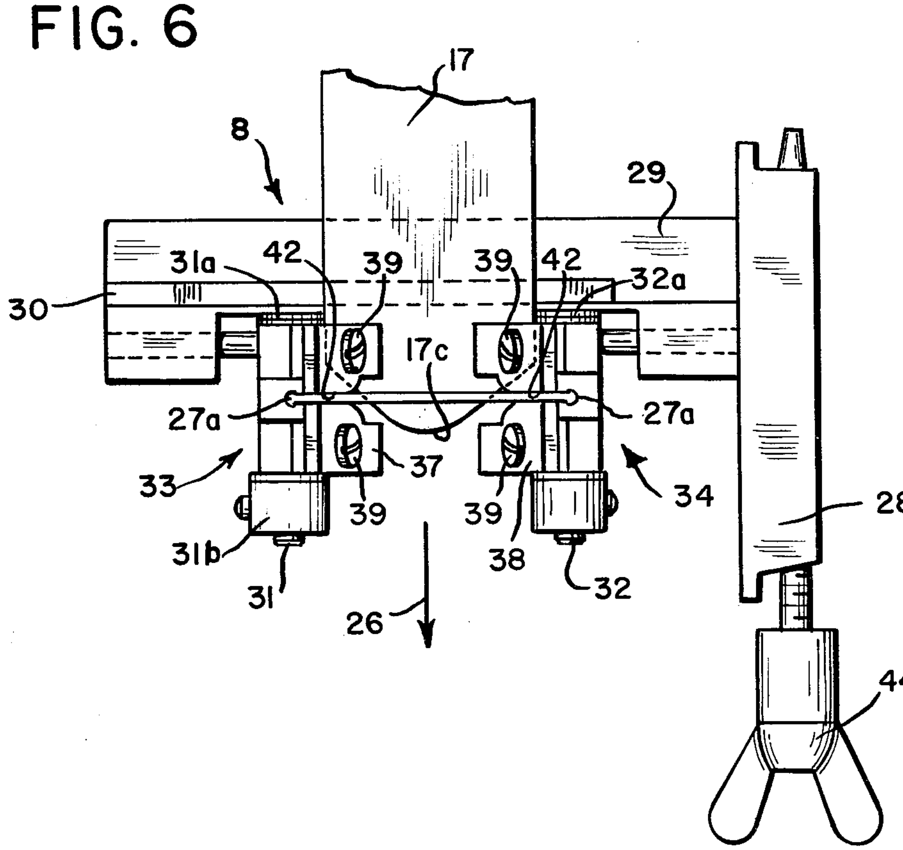
FIG. 6 shows a view like FIG. 5 using a differently shaped slat edge.

The modification shown in FIG. 6 is substantially identical to that shown in FIG. 5 excepting only for the shape of the leading edge **17*c*. As shown in FIG. 6 the leading edge 17*c* is cut with a curve such that the central part of the leading edge enters between a rung pair 27*b* first and then is followed by the rest of the width of the leading edge. For clarity the curvature of the leading edge 17*c* as shown in FIG. 6** is exaggerated and it will be appreciated that the curvature may be much more gradual and still be effective.

I claim:

1. The method of inserting a slat between a rung pair of a ladder for a slatted blind which ladder has a pair of spaced, substantially parallel, lateral uprights and a rung pair for each slat extending transversely to and between said uprights, comprising spreading and holding said lateral uprights apart to stretch a rung pair, inserting only a portion of the width of one end of a slat into the space between the stretched rung pair, said one end including an edge of significant length which in part defines said portion of the width of a slat, said inserting step including presenting said edge to said rung pair at an angle with respect to the length of said rung pair, and subsequently inserting the remainder of the width of said one end of said slat between the stretched rung pair.

2. The method according to claim 1 in which the portion of the width of said one end which is inserted initially is one of the corners defined by said one end and a lateral longitudinal edge of said slat.

3. The method of claim 2 in which said one end is substantially a 90° angle with respect to each of the lateral sides of the slat being inserted and the rung pair between which said slat is being inserted has its length positioned at an angle other than 90° with respect to the lateral longitudinal edges of the slat during insertion.

4. The method according to claim 1 in which the portion of the width of said one end which is initially inserted is other than a corner defined by said one end and the lateral longitudinal sides of the slat being inserted, and the rung pair is held and stretched with its length substantially at 90° with respect to the lateral longitudinal edges of the slat being inserted.

5. The method of claim 4 in which said one end is curved.

6. The method according to claim 1 in which said method is carried out at a first station, moving said one end to a position at a second station subsequent to the insertion of the remainder of the width of said slat between the stretched rung pair at said first station, spreading and holding the lateral uprights of a second ladder apart to stretch a second rung pair at said second station, inserting only a portion of the width of said one end into the space between said second stretched rung pair, and subsequently inserting the remainder of the width of said one end of said slat between said second stretched rung pair.

7. The method of claim 6 including lifting said slat upwardly, said lifting of said slat causing lifting of said ladders to position a new rung pair of each of said ladders for insertion of a second slat.

8. The method of claim 6 including spreading and holding the lateral uprights of the ladder at said first station to stretch a new rung pair, inserting only a portion of the width of one end of a second slat into the space between said new rung pair, and subsequently inserting the remainder of the width of said one end and said second slat therebetween.

9. The method of claim 8 including moving said one end of said second slat to said second station, spreading and holding the lateral uprights of said second ladder apart to stretch a second new rung pair, inserting only a portion of the width of one end of said second slat into the space between said second new stretched rung pair, and subsequently inserting the remainder of said one end and said second slat therebetween.

10. Apparatus for inserting a slat between a rung pair of a ladder for a slatted blind, which ladder has a pair of spaced, substantially parallel, lateral uprights and a rung pair for each slat extending transversely to and between said uprights, comprising spreader means engaging said ladder for spreading and holding said uprights apart to stretch a rung pair, feeding and guide means for inserting one end of a slat into the space between the stretched rung pair, said slat having an edge of said one end of significant length, and said feeding and guide means being so positioned with respect to said spreader means as to present said edge to a rung pair at an angle with respect to the length of said rung pair and to insert only a portion of the width of one end of said slat initially into the space between the stretched rung pair followed by final insertion of the full width of said slat.

11. The apparatus of claim 10 in which said positioning of said feed and guide means with respect to said spreader means includes said spreader means having a pair of spreading members, each spreadling member having a ladder engaging slot, and said slots being displaced with respect to each other along the direction of feed.

12. The apparatus of claim 11 including means mounting said spreading members such that they are movable away from each other.

13. The apparatus of claim 12 including resilient means for urging said spreading members apart.

14. The apparatus of claim 13 in which said mounting means for said spreading members includes means permitting the same to be pivoted apart.

15. The apparatus of claim 10 in which said positioning of said feed and guide means with respect to said spreader means includes said spreader means having a pair of spreading members, each spreading member having a ladder engaging guide slot, means mounting said spreading members such that they are pivotable away from each other, and resilient means for urging said spreading members apart.

16. The apparatus of claim 15 in which said guide slots in said spreading members face each other.

17. The apparatus of claim 15 in which each of said spreading members has at a point along the length of its guide slot a portion thereof extending toward the corresponding portion of the other spreading member whereby said portions are closer together than the sections of said guide members above and below said portions.

18. The apparatus of claim 17 in which said feed and guide means includes a guide rail closely adjacent said spreader means, said guide rail having a top surface extending in substantially the same plane as said portions.

19. The method of inserting a slat between a rung pair of a ladder for a slatted blind which ladder has a pair of spaced, substantially parallel, lateral uprights and a rung pair for each slat extending transversely to and between said uprights, comprising spreading and holding said lateral uprights apart to stretch a rung pair, inserting only a portion of the width of one end of a slat into the space between the stretched rung pair, subsequently inserting the remainder of the width of said one end of said slat between the stretched rung pair, said one end being substantially a 90° angle with respect to each of the lateral sides of the slat being inserted and the rung pair between which said slat is being inserted having its length positioned at an angle other than 90° with respect to the lateral longitudinal edges of the slat during insertion.

20. Apparatus for inserting a slat between a rung pair of a ladder for a slatted blind, which ladder has a pair of spaced, substantially parallel, lateral uprights and a rung pair for each slat extending transversely to and between said uprights, comprising spreader means engaging said ladder for spreading and holding said uprights apart to stretch a rung pair, feeding and guide means for inserting one end of a slat into the space between the stretched rung pair, said feeding and guide means being so positioned with respect to said spreader means as to insert only a portion of the width of one end of said slat initially into the space between the stretched rung pair followed by final insertion of the full width of said slat, and said positioning of said feed and guide means with respect to said spreader means including said spreader means having a pair of spreading members, each spreading member having a ladder engaging slot, and said slots being displaced with respect to each other along the direction of feed.

21. The method of inserting a slat between a rung pair of a ladder for a slatted blind which ladder has a pair of spaced, substantially parallel, lateral uprights and a rung pair for each slat extending transversely to and between said uprights, comprising spreading and holding said lateral uprights apart to stretch a rung pair, initially inserting only one corner of one end of a slat into the space between the stretched rung pair, and subsequently inserting the remainder of the width of said one end of said slat between the stretched rung pair.

* * * * *